United States Patent
Hui et al.

(10) Patent No.: US 9,779,250 B1
(45) Date of Patent: Oct. 3, 2017

(54) INTELLIGENT APPLICATION WRAPPER

(71) Applicant: Amazon Technologies, Inc., Reno, NV (US)

(72) Inventors: Allan Poon Hui, Redmond, WA (US); Douglas Andrew Hungarter, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 13/744,622

(22) Filed: Jan. 18, 2013

(51) Int. Cl.
    G06F 21/57   (2013.01)
    G05B 19/048  (2006.01)

(52) U.S. Cl.
    CPC .................. G06F 21/577 (2013.01)

(58) Field of Classification Search
    CPC . H04L 63/10; H04L 63/0227; H04L 63/0263; H04L 63/101; H04L 63/14; H04L 63/1416; H04L 63/1441; G05B 19/048
    USPC ...................... 726/1, 2, 26, 27, 30
    See application file for complete search history.

(56) References Cited

U.S. PATENT DOCUMENTS

| | | | | |
|---|---|---|---|---|
| 5,440,723 A | * | 8/1995 | Arnold ................ | G06F 21/564 714/2 |
| 2013/0160120 A1 | * | 6/2013 | Malaviya .............. | G06F 21/53 726/23 |
| 2013/0227636 A1 | * | 8/2013 | Bettini ................ | H04W 4/001 726/1 |
| 2014/0189859 A1 | * | 7/2014 | Ramanan .............. | G06F 21/56 726/22 |
| 2014/0250511 A1 | * | 9/2014 | Kendall .............. | H04L 63/0815 726/6 |

OTHER PUBLICATIONS

Helmuth et al. "Mikro-SINA-Hands-on Experiences with the Nizza Security Architecture", in Proceeding of the D.A.C.H. Security 2005, Daemstadt, Germany, Mar. 2005.*
Helmuth et al. "Mikro-SINA-Hands-on Experiences with the Nizza Security Architecture", in Prceedings of the D.A.C.H. Security 2005, Darmstadt, Germany, Mar. 2005.*

* cited by examiner

*Primary Examiner* — Tae Kim
*Assistant Examiner* — Shiuh-Huei Ku
(74) *Attorney, Agent, or Firm* — Thomas|Horstemeyer, LLP

(57) ABSTRACT

Disclosed are various embodiments for an application wrapper. Content obtained by an application can be monitored to determine conformation with a content policy for a content rating. Communications can be monitored to determine violations of a privacy agreement. Processes, files, and communications are analyzed to detect malicious activity. The application wrapper may take remedial actions with respect to distribution of the application by an application distribution system.

24 Claims, 6 Drawing Sheets

INTELLIGENT APPLICATION WRAPPER

BACKGROUND

Applications may implement dynamically changing functionality due to communications with third-party services or application updates. Problems arise in determining how these changes affect the application's content rating, privacy policies, or security.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Application functionality may change over time due to communications with third parties, or through application updates. For example, an application may obtain content from a third-party server for presentation to a client. This content may contain explicit or otherwise inappropriate content with respect to a content rating of the application. Typically, the application is automatically assigned a higher content rating to account for the possibility of presenting inappropriate content. As another example, an application may be configured to communicate information to a third-party. This information may contain personal or private data that a client has not agreed to have submitted in accordance with a privacy agreement. Additionally, obtained content or application updates may initiate malicious or virulent processes in the client.

An application wrapper can provide for application-level analysis of application processes and communications. Content obtained by the application can be analyzed to determine if the content conforms to a content policy determined as a function of a content rating of the application. This allows for lower content ratings to be assigned to an application until the obtained content necessitates an increase in the content rating. Communications sent by the application can be analyzed to determine if they contain personal or private information communication of which has not been agreed upon by a user. Additionally, the application wrapper can monitor application files or processes to determine if they are associated with malicious operations. The application wrapper can also communicate warnings to a user of the client, or modify the content rating or distribution of the application by an application distribution service.

In the following discussion, a general description of the system and its components is provided, followed by a discussion of the operation of the same.

Figure 1:
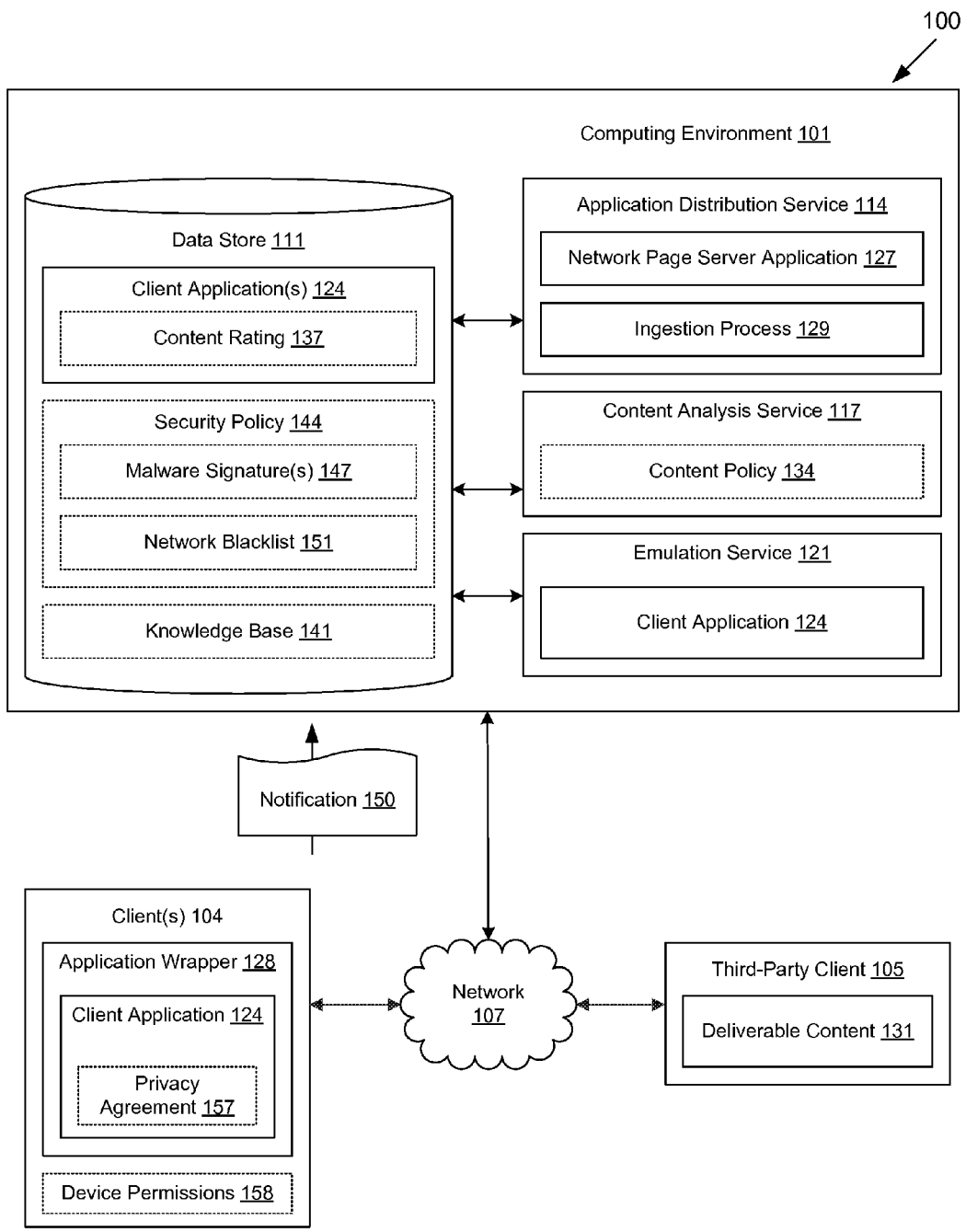
FIG. 1 is a drawing of a networked environment according to various embodiments of the present disclosure.

With reference to FIG. 1, shown is a networked environment 100 according to various embodiments. The networked environment 100 includes a computing environment 101, a client 104, and a third-party client 105, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include an application distribution service 114, a content analysis service 117, an emulation service 121, and other applications, services, processes, systems, engines, or functionality not discussed in detail herein. The application distribution service 114 is executed to facilitate the purchase, rental, or distribution of client applications 124. This may comprise consummating financial or other transactions associated with the purchase, rental, or distribution of the client application 124. This may also comprise communication of the client applications 124 to clients 104 via the network 107. The application distribution service 114 may implement a network page server application 127 to encode network pages for communication to the client 104 to facilitate the acquisition of client applications 124.

Additionally, the application distribution service 114 may apply an application wrapper 128 to instances of client applications 124. This may be performed by an ingestion process 129 which applies the application wrapper 128 to instances of client applications 124 upon submission for distribution. This may also be performed by another approach.

The content analysis service 117 obtains deliverable content 131 to be presented to a user of a client 104 executing a client application 124. For example, deliverable content 131 may comprise a network page or text served by a third party 105 to a client 104. The deliverable content 131 may also comprise images, audio, video, or other data to be rendered by a client application 124. The content analysis service 117 determines if the deliverable content 131 conforms to a content policy 134 associated with a content rating 137 of the client application 124. The content policy 134 defines conditions, rules, or other criteria for the content of a client application 124 having a given content rating 137. The conditions defined in the content rating 137 may be defined with respect to content, locality or country, language, or with respect to another factor. For example, a content policy 134 for a given content rating 137 may comprise a list of words not permitted under the content policy 134 for presentation to a client 104 in a particular country. The content analysis service 117 may then determine if the deliverable content 131 comprises a word included in the list of unpermitted words. This may comprise text matching, speech recognition of audio, text recognition of an image or video, or by another approach.

As another example, the content policy for a given content rating 137 may not permit images or video containing explicit imagery. In such an embodiment, the content analysis service 117 may apply image or video recognition to the deliverable content 131 to determine if it comprises explicit imagery. The content analysis service 117 may be facilitated by a knowledge base 141, such as in applying a machine learning algorithm to the deliverable content 131. The content analysis service 117 may also determine if deliverable content 131 conforms to a content policy 134 by another approach.

The emulation service 121 simulates the performance of a client 104 to facilitate the execution of an instance of a client application 124 in the computing environment 101. The emulation service 121 may simulate various configuration variances of clients 104 including hardware configurations, operating system configurations, installed or executed functionality, or other aspects of clients 104.

The data stored in the data store 111 includes, for example, client applications 124, security policies 144, a knowledge base 141, and potentially other data. Security policies 144 comprise conditions, criteria, or other factors indicative of a client application 124 initiating or otherwise facilitating malicious processes on a client 104. For example, the security policy 144 may comprise one or more malware signatures 147 generated as a function of files or processes executed on a client 104. These malware signatures 147 may comprise hashes generated by a hash function such as Message Digest 5 (MD5), Secure Hashing Algorithm 1 (SHA-1), or another hash function. The malware signatures 147 may also comprise byte signatures, binary diffing patterns, or other data.

In some embodiments, the malware signatures 147 may comprise heuristics to be applied to files or operations of the client 104 indicative of malicious operations. For example, the heuristics may comprise rules or conditions to satisfy a heuristic analysis of the operation of the client 104. The malware signatures 147 may also comprise other data, as well.

The security policy 144 may also comprise a network blacklist 151. The network blacklist 151 comprises network locations which, when communicated with by a client application 124, indicate malicious activity by the client application 124. The network blacklist 151 may comprise internet protocol addresses (IP addresses), ranges of IP addresses, uniform resource locators (URLs), or other identifiers. The network blacklist 151 may also comprise rules or conditions which, when satisfied by communications of the client application 124, indicate malicious activities. This may comprise URL domains or subdomains, geographical locations corresponding to IP addresses or other identifiers, or other conditions. Other information may also be included in the network blacklist 151.

The knowledge base 141 comprises data to facilitate the application of machine learning, matching, or other algorithms to deliverable content 131 by the content analysis service 117 to determine if the deliverable content 131 conforms to a content policy 134. The knowledge base 141 may comprise deliverable content 131 samples which have been categorized, tagged with metadata, or otherwise classified to facilitate supervised machine learning or matching. The knowledge base 141 may also comprise known file signatures, hashes, or identifiers of content known to violate a content policy 134. Other information may also be included in the knowledge base 141.

The client 104 and third-party client 105 are representative of a plurality of client devices that may be coupled to the network 107. The client 104 and third-party client 105 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 124 and/or other applications. The client application 124 may be executed in a client 104, for example, to access network content served up by the computing environment 101 and/or other servers. To this end, the client application 124 may comprise, for example, a browser, a dedicated application, etc. The client 104 may be configured to execute applications beyond the client application 124 such as, for example, email applications, social networking applications, word processors, spreadsheets, and/or other applications.

An application wrapper 128 may be applied to the client application 124. The application wrapper 128 may monitor deliverable content 131 obtained by the client application 124 to which it is applied to ensure conformity to a content policy 134 associated with the content rating 137 of the client application. For example, the client application 124 may obtain a network page deliverable content 131 from a third-party client 105. The application wrapper 128 may determine if the network page comprises text included in a list of explicit language outside of the content policy 134.

In other embodiments, the application wrapper 128 may determine if video, images, or audio deliverable content 131 obtained from the third-party client 105 violate the content policy 134 associated with the content rating 137 of the client application 124. This may comprise performing speech recognition on audio to determine if the audio comprises explicit language according to the content policy 134. This may also comprise performing an image analysis or applying machine learning to the audio, images, or video to determine if they comprise content violating the content policy 134. In some embodiments, the application wrapper 128 may communicate the deliverable content 131 to a content analysis service 117 to determine if the deliverable content 131 violates the content policy 134. In other embodiments, the application wrapper 128 may communicate a reference or identifier of the deliverable content 131 to the content analysis service 117 to facilitate an obtaining of the deliverable content 131 by the content analysis service 117. For example, the application wrapper 128 may communicate a URL of a network page to the content analysis service 117 for analysis. Other approaches may also be used to determine if the deliverable content 131 violates the content policy 134.

In some embodiments, a violation of the content policy 134 may comprise deliverable content 131 being associated with a lesser content rating 137 than the content rating 137 currently applied to a client application 124. For example, deliverable content 131 may comprise an update to a mature rated client application 124 which renders the client application 124 targeted towards younger audiences.

If deliverable content 131 violates a content policy 134, the application wrapper 128 may communicate a notification 150 to the application distribution service 114 indicating that the content rating 137 of the client application 124 should be changed to reflect the deliverable content 131. The application wrapper 128 may also transform, censor, or otherwise modify the deliverable content 131 to conform with the content policy 134 prior to rendering the deliverable content 131. For example, the application wrapper 128 may substitute strings or characters in place of explicit language encoded in a network page. Other responses may also be taken by the application wrapper 128 responsive to deliverable content 131 violating the content policy 134.

The application wrapper 128 may also determine if the client application 124 communicates personal or private data in violation of a privacy agreement 157 or device permissions 158. Personal or private data may include names, addresses, email addresses, usernames, passwords, social security numbers, account numbers or identifiers, or other data to which a user of a client application 124 may wish to restrict access. The privacy agreement 157 defines which personal or private data a user of a client application 124 agrees to be communicated. The privacy agreement 157 may also define acceptable formatting or encoding for communicated personal or private data, such as requiring encryption or other transformations. The device permissions 158 define client 104 functionality or data accessible to executed client applications 124. The application wrapper 128 may monitor communications sent by the application wrapper 128 to determine if they comprise personal or private data. If the communications do comprise personal or private data, the application wrapper 128 may then determine if a user of the client application 124 has agreed to their communication by agreeing to a privacy agreement 157 or if the communication conforms to device permissions 158.

If a user of a client application 124 has not agreed to the communication of the personal or private data, the application wrapper 128 may halt the communication of the personal or private data and encode a warning to the user of the client application 124. This may comprise encoding for rendering a user interface element, or some other approach. In some embodiments, the warning may accept a user input indicating an agreement to communicate personal or private data at that instance, an agreement to the privacy agreement 157, or a modification to device permissions 158. In other embodiments, the application wrapper 128 may communicate a notification 150 to the application distribution service 114 indicating that the client application 124 should be quarantined, should have a warning or other notice assigned to it, should have its distribution terminated, or should have some other remedial action performed.

The application wrapper 128 may also monitor processes, files, or other components created or modified in association with an execution of the client application 124 to detect malicious operations of the client application 124. For example, the application wrapper 128 may generate signatures of files, processes, or components associated with the client application 124 and determine if they match a malware signature 147 included in the security policy 144. The application wrapper 128 may also perform a heuristic analysis of the client application 124 in accordance with the malware signatures 147. The application wrapper 128 may also monitor incoming or outgoing communications of the client application 124 to determine if the client application 124 communicates with a network location included in a network blacklist 151 or with a network location outside a predefined list of network locations, or whitelist. Other approaches may also be used to detect malicious operations of the client application 124. To this end, the application wrapper 128 may also obtain updated security policies 144 from the computing environment 101.

In some embodiments, the content analysis service 117 may also determine if a client application 124 is operating maliciously by heuristic analysis, malware signature 147 comparison, network blacklist 151 comparison, or by another approach.

Responsive to a determination that the client application 124 is operating maliciously, the application wrapper 128 may communicate a notification to the application distribution service 114 that the client application 124 should be quarantined, have its distribution termination, should be reverted to a previous version, or should have some other remedial action taken.

The third-party client 105 is configured to communicate deliverable content 131 to clients 104 executing a client application 124. Communicating deliverable content 131 may comprise serving network pages or content encoded for dedicated applications. Communicating deliverable content 131 may also comprise serving image, audio, or video deliverable content to client applications 124 via streaming, file download, or another approach.

Next, a general description of the operation of the various components of the networked environment 100 is provided. Although the following discussion refers to an execution of a client application 124 on a client 104, it is understood that the client application 124 may also be executed in an emulated instance of a client 104 facilitated by an emulation service 121 executed in the computing environment 101.

To begin, an ingestion process 129 applies an application wrapper 128 to an instance of a client application 124. Next, a client 104 obtains an instance of the client application 124 to which the application wrapper 128 has been applied via a network 107 as facilitated by an application distribution service 114. This may comprise a client 104 purchasing, renting, downloading, or otherwise obtaining an instance of the client application 124. Next, the client 104 begins execution of the client application 124 having an application wrapper 128.

The client application 124 may attempt to obtain deliverable content 131 from a third-party client 105 for presentation to a user of the client application 124. This may comprise obtaining network pages, text, images, video, audio, or other data as deliverable content 131. The application wrapper 128 may determine if the obtained deliverable content 131 violates a content policy 134 associated with a content rating 137 of the client application 124. This may comprise performing text or string matching, speech recognition on audio or video, image analysis, text recognition on images or video, or another function to determine if the deliverable content 131 violates the content policy 134. In some embodiments, these functions are performed on the client 104. In other embodiments, these functions are performed by a content analysis service 117 executed in the computing environment 101 responsive to the application wrapper 128 communicating the deliverable content 131 or a reference to the deliverable content 131 to the content analysis service 117. The content analysis service 117 may be facilitated by a knowledge base 141 or other data.

If the deliverable content 131 violates the content policy 134, the application wrapper 128 may censor, transform, or modify the deliverable content 131 prior to rendering by the client application 124. The application wrapper 128 may also communicate a warning to a user of the client application 124 that the delivery content 131 violates the content policy 134. In other embodiments, the application wrapper 128 may communicate a notification 150 to an application distribution service 114 indicating that the content rating 137 of the client application 124 should be modified to reflect the deliverable content 131. Other actions may also be taken responsive to the deliverable content 131 violating the content policy 134.

The client application 124 may also send communications via the network 107 to third-party clients 105. The application wrapper 128 may determine if these communications comprise personal or private data in violation or in absence of a privacy agreement 157. In such an embodiment, the application wrapper 128 may prevent the transmission of these communications. Additionally, the application wrapper 128 may communicate a warning to a user of the client application 124. For example, the application wrapper 128 may encode for rendering a popup notification indicating the communication of personal or private data. In some embodiments the notification may accept input from a user indicating permission to send the communications, prompting the user to agree to the privacy agreement 157, or take some other action. Additionally, the application wrapper 128 may communicate a notification 150 via the network 107 to the application distribution service 114 to quarantine, terminate distribution, or take another remedial action with respect to the client application 124 responsive to the client application 124 violating the privacy agreement 157.

The application wrapper 128 may also determine if the client application 124 is associated with malicious performance. This determination may be made upon startup of the client application 124, at predefined intervals, responsive to an update or subsequent version release of the client application 124, responsive to user input, or responsive to some other event.

The application wrapper 128 may determine if the client application 124 is associated with malicious performance by generating signatures as a function of files or processes associated with the client application 124. These signatures are then compared to malware signatures 147 embodied in a security policy 144. This may comprise comparing the generated signatures to malware signatures 147 embodied in a security policy 144 stored on the client 104. This may also comprise communicating the generated signatures to the computing environment 101 via the network 107 for comparison by a process or service executed in the computing environment 101. A generated signature matching a malware signature 147 indicates that the client application 124 is associated with malicious performance.

Malicious performance of the client application 124 may also be indicated by the client application 124 communicating with a network location matching identifiers or criteria embodied in a network blacklist 151. In such an embodiment, the application wrapper 128 monitors communications sent from and to the client application 124 to determine if the origin or destination is included in the network blacklist 151.

Responsive to the client application 124 being associated with malicious performance, the application wrapper 128 may quarantine the client application 124. The application wrapper 128 may also communicate a notification 150 to the application distribution service 114 to terminate or suspend distribution of the client application 124. Other actions may also be taken in response to the client application 124 being associated with malicious performance.

Figure 2:
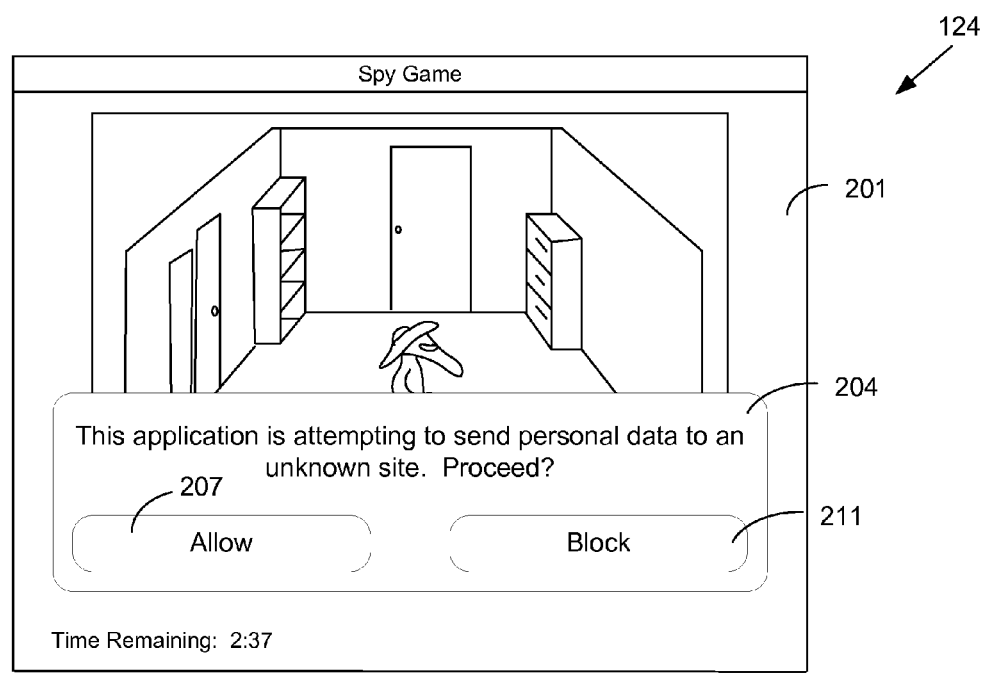
FIG. 2 is a drawing of an example of a user interface rendered by a client in the networked environment of FIG. 1 according to various embodiments of the present disclosure.

Referring next to FIG. 2, shown is a user interface rendered by a client application 124 (FIG. 1) having an application wrapper 128 (FIG. 1). Item 201 comprises a user interface window of an example game client application 124 which is attempting to communicate personal data to a third-party client 105 (FIG. 1) in violation of a privacy agreement 157 (FIG. 1). Item 204 is a popup notification encoded for rendering by the application wrapper 128 responsive to the client application 124 attempting to communicate the personal data. Item 207 is a user interface button which, when clicked, ends the application wrapper 128 blocking the communication and allows the personal data to be communicated to the third-party client 105. Item 211 is a user interface button which, which clicked, dismisses the notification and indicates to the application wrapper 128 to continue blocking the communication.

Figure 3:
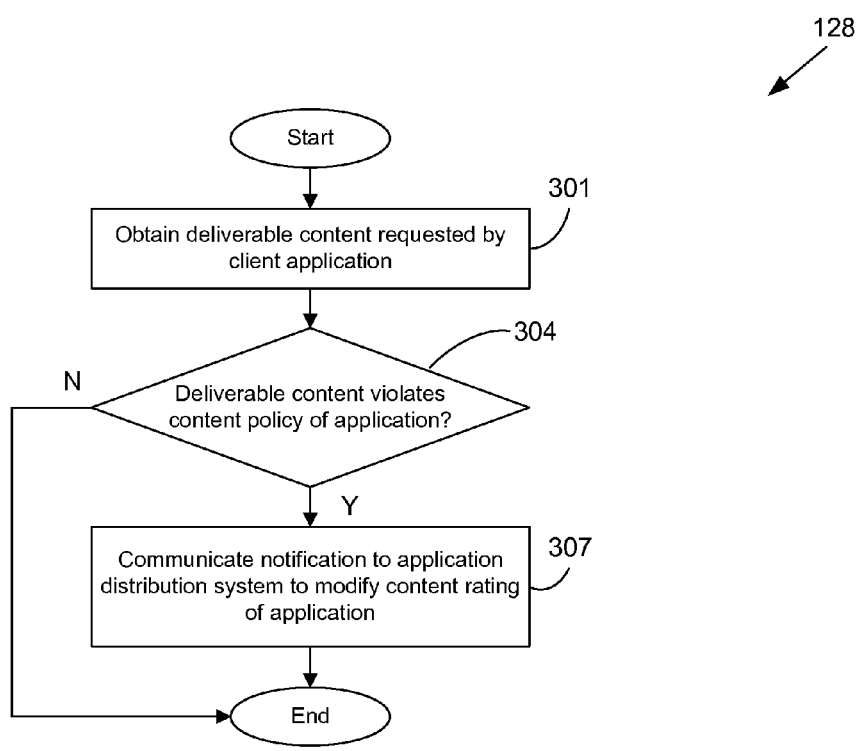
FIG. 3 is a flowchart illustrating one example of functionality implemented as portions of an application wrapper executed in a client in the networked environment of FIG. 1 according to various embodiments of the present disclosure.

Referring next to FIG. 3, shown is a flowchart that provides one example of the operation of a portion of the application wrapper 128 (FIG. 1) according to various embodiments. It is understood that the flowchart of FIG. 3 provides merely an example of the many different types of functional arrangements that may be employed to implement the operation of the portion of the application wrapper 128 as described herein. As an alternative, the flowchart of FIG. 3 may be viewed as depicting an example of steps of a method implemented in the client 104 (FIG. 1) according to one or more embodiments.

Beginning with box 301, the application wrapper 128 obtains deliverable content 131 from a third-party client 105 requested by a client application 124. This may comprise the application wrapper 128 implementing communication proxy functionality, or some other approach. Next, in box 301, the application wrapper 128 determines if the deliverable content 131 violates a content policy 134 (FIG. 1) as a function of a content rating 137 (FIG. 1) of the client application 124. In some embodiments, this comprises determines if text of the deliverable content 131 matches a list of explicit content embodied in the content policy 134.

In other embodiments, this comprises communicating the deliverable content 131 or a reference or identifier of the deliverable content 131 to a content analysis service 117 (FIG. 1) executed in the computing environment 101 (FIG. 1). The content analysis service 117 may perform text recognition, pattern recognition, speech recognition, or other functions on the deliverable content 131 to determine if it violates the content policy 134. The content analysis service 117 may facilitate this determination as a function of a knowledge base 141 (FIG. 1). The determination is then communicated to the application wrapper 128 via the network 107 (FIG. 1).

In box 307, if the deliverable content 131 violates the content policy 134, the application wrapper communicates a notification 150 (FIG. 1) to an application distribution service 114 (FIG. 1) indicating that the content rating 137 of the client application 124 should be modified to reflect the deliverable content 131. Otherwise, the process ends.

Figure 4:
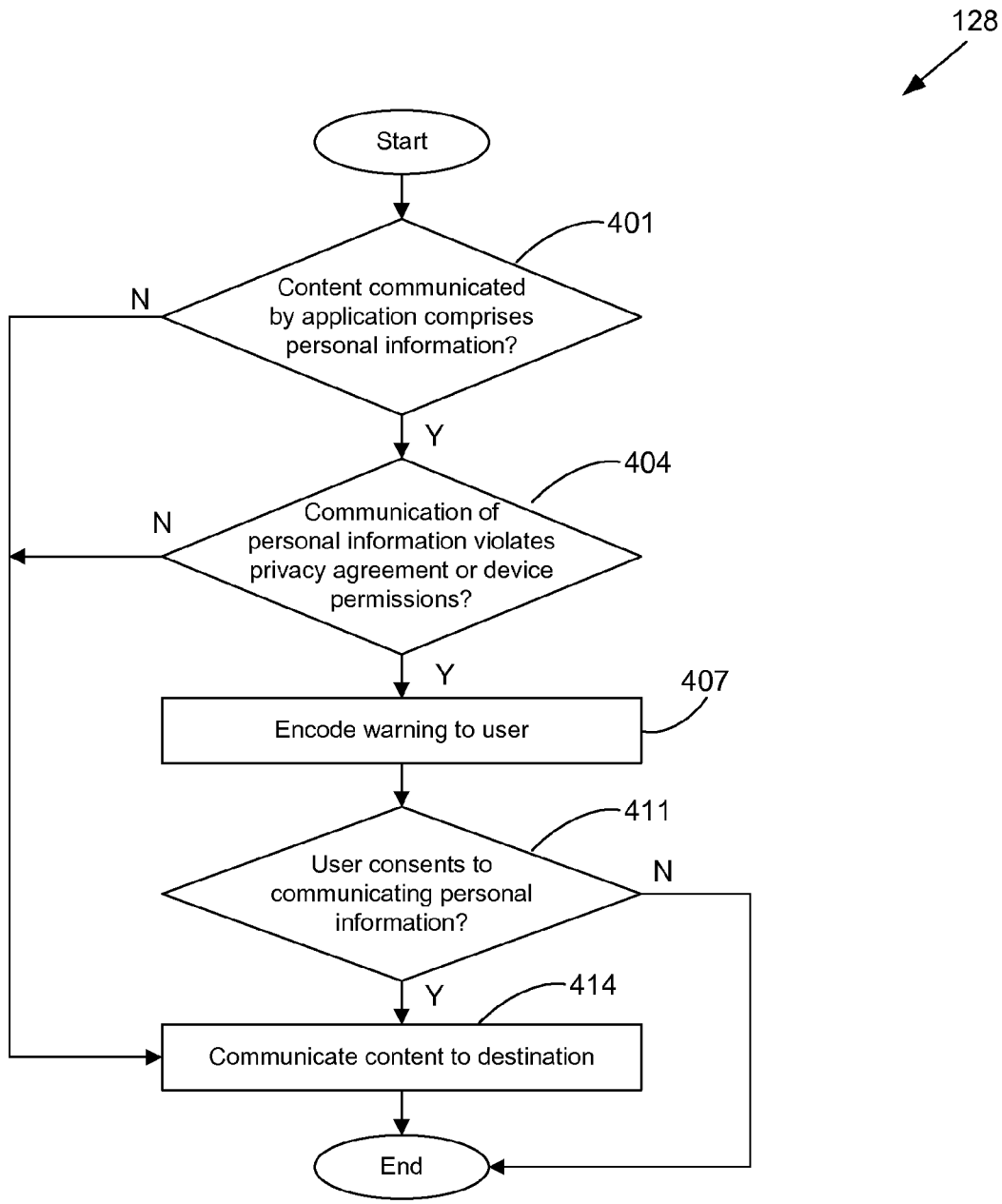
FIG. 4 is a flowchart illustrating one example of functionality implemented as portions of an application wrapper executed in a client in the networked environment of FIG. 1 according to various embodiments of the present disclosure.

Referring next to FIG. 4, shown is a flowchart that provides one example of the operation of a portion of the application wrapper 128 (FIG. 1) according to various embodiments. It is understood that the flowchart of FIG. 4 provides merely an example of the many different types of functional arrangements that may be employed to implement the operation of the portion of the application wrapper 128 as described herein. As an alternative, the flowchart of FIG. 4 may be viewed as depicting an example of steps of a method implemented in the client 104 (FIG. 1) according to one or more embodiments.

In box 401, the application wrapper 128 determines if content communicated by its corresponding client application 124 (FIG. 1) comprises personal information. This may comprise the application wrapper 128 implementing proxy functionality, or some other functionality to enable access to the communications of the client application 124. Determining if the content comprises personal information may comprise applying regular expression functionality to determine if the content matches formats associated with personal information. The determination may also comprise determining if the content contains information known to the application wrapper 128. Other approaches may also be used to determine if the content communicated by the client application 124 comprises personal information.

If the content does not comprise personal information, then the process proceeds to box 414. Otherwise, in box 404, the application wrapper determines if communicating the personal information violates a privacy agreement 157 (FIG. 1) or device permissions 158 (FIG. 1). This may comprise determining if a user of the client application 124 agreed to the privacy agreement 157. This may also comprise determining if the personal information is covered by the terms, rules, conditions, or criteria embodied in the privacy agreement 157. This may further comprise determining if the client application 124 as sufficient permissions to perform the communication as embodied by the device permissions 158. If communicating the personal information does not violate the privacy agreement 157 or device permissions 158 the process ends.

If communicating the content violates the privacy agreement 157 then the process proceeds to box 407 where the application wrapper 128 encodes a warning for communication to the user of the client application 124. This may comprise encoding for rendering a user interface element such as a popup message, or some other approach.

Next, in box 414, the application wrapper 128 determines if the user consents to communicating the personal information. This may comprise accepting an input to a popup notification embodying the warning encoded in box 407, or some other activity. If the user consents to communicating the personal information then the process proceeds to box 414 where the content is communicated to the destination. Otherwise, the process ends.

Figure 5:
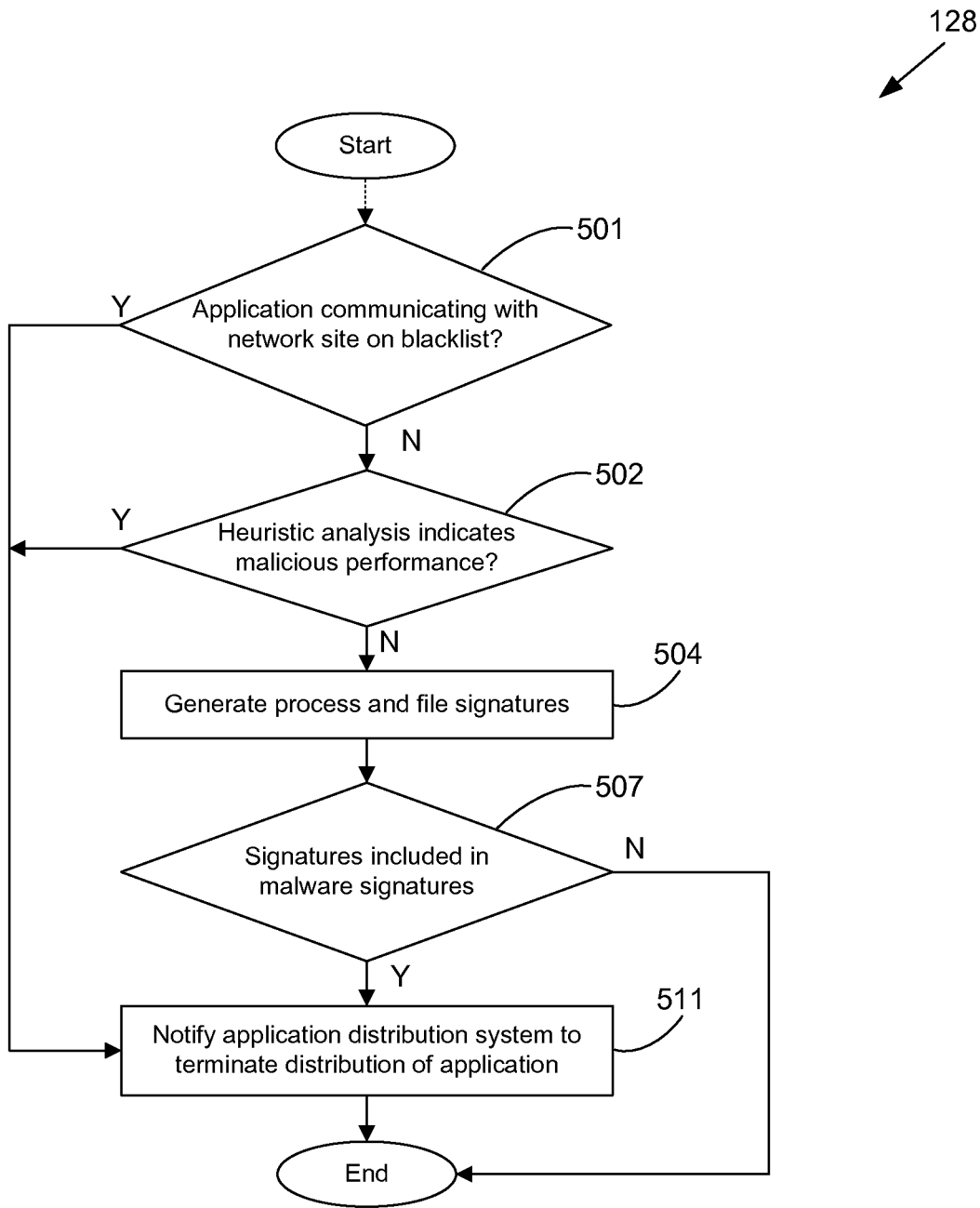
FIG. 5 is a flowchart illustrating one example of functionality implemented as portions of an application wrapper executed in a client in the networked environment of FIG. 1 according to various embodiments of the present disclosure.

Referring next to FIG. 5, shown is a flowchart that provides one example of the operation of a portion of the application wrapper 128 (FIG. 1) according to various embodiments. It is understood that the flowchart of FIG. 5 provides merely an example of the many different types of functional arrangements that may be employed to implement the operation of the portion of the application wrapper 128 as described herein. As an alternative, the flowchart of FIG. 5 may be viewed as depicting an example of steps of a method implemented in the client 104 (FIG. 1) according to one or more embodiments.

Beginning with box 501, the application wrapper 128 (FIG. 1) determines if the corresponding client application 124 (FIG. 1) is communicating with a network site included in a network blacklist 151 (FIG. 1). This may comprise analyzing the destination network address of packets or communications sent from or directed to the client application 124. This may also comprise determining if settings or configuration files of the client application 124 reference a network site included in the network blacklist 151. Other approaches may also be used to determine if the client application 124 communicates with a network site included in the network blacklist 151.

If the client application 124 is communicating with a network site included in the network blacklist 151, the process proceeds to box 511. Otherwise, the process proceeds to box 502 where the application wrapper 128 determines if a heuristic analysis indicates malicious performance by the client application 124. This may comprise determining if files or processes associated with the client application 124 embody states or conditions indicative of malicious performance. Such states or conditions may be embodied in malware signatures 147, data obtained from a computing environment 101 (FIG. 1) via a network 107 (FIG. 1), or other data.

If the heuristic analysis is indicative of malicious performance by the client application 124, the process proceeds to box 511. Otherwise, the process proceeds to box 504 where the application wrapper 128 generates signatures for files and processes associated with the client application 124. This may comprise generating hash codes, byte signatures, or another approach. Next, in box 507, the application wrapper 128 determines if the generated signatures are included in a list of malware signatures 147.

If a generated signature is included in a list of malware signatures 147 the process proceeds to box 511 where the application wrapper 128 communicates a notification 150 (FIG. 1) to an application distribution service 114 (FIG. 1) via the network 107 (FIG. 1) to terminate distribution of the client application 124. Otherwise, the process ends.

Figure 6:
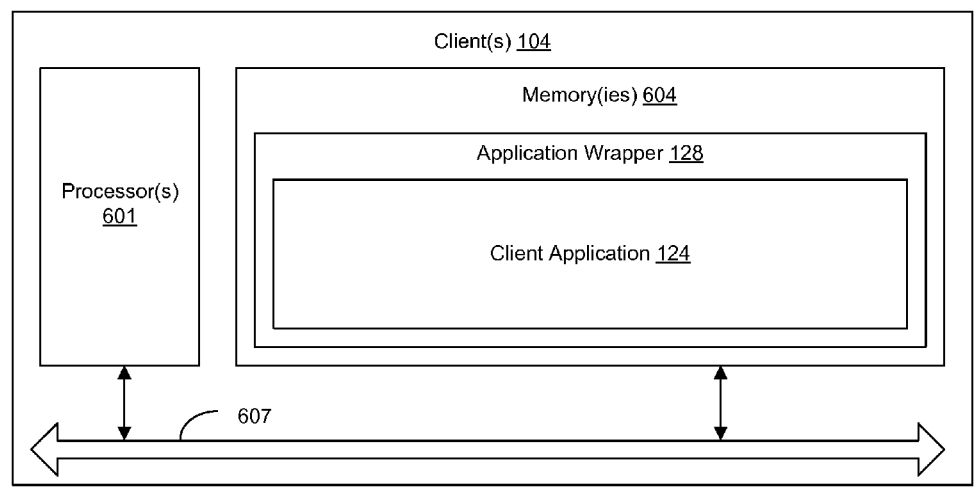
FIG. 6 is a schematic block diagram that provides one example illustration of a computing environment employed in the networked environment of FIG. 1 according to various embodiments of the present disclosure.

With reference to FIG. 6, shown is a schematic block diagram of the client 104 according to an embodiment of the present disclosure. The client 104 includes at least one processor circuit, for example, having a processor 601 and a memory 604, both of which are coupled to a local interface 607. To this end, each client 104 may comprise, for example, at least one server computer or like device. The local interface 607 may comprise, for example, a data bus with an accompanying address/control bus or other bus structure as can be appreciated.

Stored in the memory 604 are both data and several components that are executable by the processor 601. In particular, stored in the memory 604 and executable by the processor 601 are an application wrapper 128 (FIG. 1) applied to a client application 124 (FIG. 1), and potentially other applications. Also stored in the memory 604 may be other data. In addition, an operating system may be stored in the memory 604 and executable by the processor 601.

It is understood that there may be other applications that are stored in the memory 604 and are executable by the processor 601 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 604 and are executable by the processor 601. In this respect, the term "executable" means a program file that is in a form that can ultimately be run by the processor 601. Examples of executable programs may be, for example, a compiled program that can be translated into machine code in a format that can be loaded into a random access portion of the memory 604 and run by the processor 601, source code that may be expressed in proper format such as object code that is capable of being loaded into a random access portion of the memory 604 and executed by the processor 601, or source code that may be interpreted by another executable program to generate instructions in a random access portion of the memory 604 to be executed by the processor 601, etc. An executable program may be stored in any portion or component of the memory 604 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 604 is defined herein as including both volatile and nonvolatile memory and data storage components. Volatile components are those that do not retain data values upon loss of power. Nonvolatile components are those that retain data upon a loss of power. Thus, the memory 604 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 601 may represent multiple processors 601 and/or multiple processor cores and the memory 604 may represent multiple memories 604 that operate in parallel processing circuits, respectively. In such a case, the local interface 607 may be an appropriate network that facilitates communication between any two of the multiple processors 601, between any processor 601 and any of the memories 604, or between any two of the memories 604, etc. The local interface 607 may comprise additional systems designed to coordinate this communication, including, for example, performing load balancing. The processor 601 may be of electrical or of some other available construction.

Although the application wrapper 128, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3, 4, and 5 show the functionality and operation of an implementation of portions of the application wrapper 128. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 601 in a computer system or other system. The machine code may be converted from the source code, etc. If embodied in hardware, each block may represent a circuit or a number of interconnected circuits to implement the specified logical function(s).

Although the flowcharts of FIGS. 3, 4, and 5 show a specific order of execution, it is understood that the order of execution may differ from that which is depicted. For example, the order of execution of two or more blocks may be scrambled relative to the order shown. Also, two or more blocks shown in succession in FIGS. 3, 4, and 5 may be executed concurrently or with partial concurrence. Further, in some embodiments, one or more of the blocks shown in FIGS. 3, 4, and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the application wrapper 128, that comprises software or code can be embodied in any non-transitory computer-readable medium for use by or in connection with an instruction execution system such as, for example, a processor 601 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system comprising:
   at least one electronic data store configured to at least store computer-executable instructions; and
   at least one computing device in communication with the at least one electronic data store, the at least one computing device configured to at least:
      apply an application wrapper to an application executable in a client device, the application wrapper configured to at least:
         monitor communication obtained by the application in the client device from a second computing device over a network;
         determine a predefined threat condition for the communication transmitted or received by the application as a function of a content rating of the application, the predefined threat condition indicating a violation of a content policy associated with the content rating;
         determine whether the communication associated with the application comprises content satisfying the predefined threat condition; and
         initiate, responsive to the communication comprising content satisfying the predefined threat condition, a remedial action comprising modifying a distribution state of the application in an application distribution system, wherein modifying the distribution state comprises suppressing a distribution of the application by the application distribution system by suspending an ability to purchase or rent the application to a plurality of clients.

2. The system of claim 1, wherein determining whether the communication comprises content satisfying the predefined threat condition further comprises determining whether the content comprises text to be rendered by the client device executing the application, the text being included in a predefined list of explicit content.

3. The system of claim 1, wherein the application wrapper is further configured to at least modify, responsive to the content exceeding the content rating, the content to comply with the content rating.

4. The system of claim 1, wherein the communication is communicated by the application, and the predefined threat condition comprises:
   the content comprising personal information associated with a user of the application; and
   the application lacking sufficient permissions granted by the user to communicate the personal information over the network.

5. The system of claim 1, further comprising:
   a client device emulation service executable in the at least one computing device, the at least one computing device is further configured to at least simulate an operation of the client device; and
   wherein the application is executed in an emulated instance of the client device.

6. The system of claim 1, wherein the predefined threat condition comprises the content being associated with an execution of at least one malicious process on the client device executing the application.

7. The system of claim 6, wherein determining whether the communication comprises content satisfying the predefined threat condition further comprises initiating a heuristic monitoring for the malicious process in the client device.

8. The system of claim 6, wherein determining whether the communication comprises content satisfying the predefined threat condition further comprises:
   generating a signature as a function of the application, the communication, or a process executed on the client device;
   determining if the signature matches one of a plurality of malicious content signatures; and
   wherein the predefined threat condition is satisfied responsive to the signature matching one of the malicious content signatures.

9. The system of claim 1, wherein the application is one of a plurality of applications, and the applications are associated with a vendor.

10. The system of claim 1, wherein the predefined threat condition comprises the communication being directed to a network site included in a plurality of blacklisted network sites.

11. The system of claim 1, further comprising a content analysis service executable in the at least one computing device, the at least one computing device is further configured to at least:
    obtain the content from the client device; and
    determine whether the content satisfies the predefined threat condition; and
    wherein the application wrapper is further configured to at least:
       communicate the content to the content analysis service; and
       obtain, from the content analysis service, a determination of whether the content satisfies the predefined threat condition.

12. The system of claim 11, wherein determining whether the content satisfies the predefined threat condition further comprises applying a machine learning function to the content and a knowledge base.

13. A computer-implemented method comprising:
    applying, by a computing device, an application wrapper to an application that is executable in the computing device;
    monitoring, by the application wrapper in the computing device, content communicated between the application in the computing device and a second computing device over a network;
    determining, by the application wrapper in the computing device, a content policy for the application as a function of a content rating of the application;
    determining, by the application wrapper in the computing device, whether the content communicated by or obtained by the application violates the content policy; and
    initiating, by the application wrapper in the computing device, responsive to the content violating the content policy, a remedial action comprising modifying a distribution state of the application in an application distribution system, wherein modifying the distribution state comprises suppressing a distribution of the application by the application distribution system by suspending an ability to purchase or rent the application to a plurality of clients.

14. The computer-implemented method of claim 13, wherein the content policy comprises permissions agreed upon by a user to communicate personal information, and the remedial action further comprises terminating a communication of the content over the network to the second computing device.

15. The computer-implemented method of claim 13, wherein the distribution state comprises a content rating of the application, the content policy comprises restrictions on content presented to a user of the application, the restrictions being a function of the content rating, and modifying the distribution state comprises modifying the content rating of the application.

16. The computer-implemented method of claim 13, wherein determining whether the content violates the content policy comprises determining whether the content initiates an execution of a malicious process by the computing device based at least in part on a heuristic analysis of the computing device.

17. The computer-implemented method of claim 13, wherein determining whether the content violates the content policy comprises determining whether the content is being communicated to a network site included in a network site blacklist or excluded from a network site whitelist.

18. The computer-implemented method of claim 13, wherein modifying the distribution state of the application comprises modifying the content rating of the application.

19. The computer-implemented method of claim 13, wherein the remedial action further comprises blocking communication over the network to the second computing device.

20. The computer-implemented method of claim 13, wherein determining further comprises:
communicating, by the computing device, the content to a content analysis service implementing a machine learning knowledge base; and
obtaining, by the computing device, a determination of whether the content violates the content policy.

21. A non-transitory computer-readable medium embodying a program executable in a computing device, wherein, when executed, the program causes the computing device to at least:
apply an application wrapper to an application that is executable in the computing device;
monitor, by the application wrapper, content communicated between the application in the computing device and a second computing device over a network;
determine, by the application wrapper, a content policy for the application as a function of a content rating of the application;
determine, by the application wrapper, whether the content communicated by or obtained by the application violates the content policy; and
initiate, by the application wrapper, responsive to the content violating the content policy, a remedial action comprising modifying a distribution state of the application in an application distribution system, wherein modifying the distribution state comprises suppressing the distribution of the application by the application distribution system by suspending an ability to purchase or rent the application to a plurality of clients.

22. The non-transitory computer-readable medium of claim 21, wherein the content policy comprises permissions agreed upon by a user to communicate personal information, and the remedial action further comprises terminating a communication of the content.

23. The non-transitory computer-readable medium of claim 21, wherein the content rating based at least in part on at least one of content subject matter, country, or language.

24. The non-transitory computer-readable medium of claim 21, wherein the content is delivered to the application subsequent to modifying the content rating.

* * * * *